Jan. 2, 1951 J. R. RIX ET AL 2,536,769
SPRING SUSPENSION OF MOTOR VEHICLES
Filed Oct. 23, 1947

Patented Jan. 2, 1951

2,536,769

UNITED STATES PATENT OFFICE 2,536,769

SPRING SUSPENSION OF MOTOR VEHICLES

John Robert Rix and Arthur William Ellcock, Barnt Green, near Birmingham, England, assignors to The Austin Motor Company Limited, Birmingham, England Application October 23, 1947, Serial No. 781,612
In Great Britain October 24, 1946

4 Claims. (Cl. 280—104)

This invention relates to spring suspension for motor vehicles and of the type in which the road wheels at the opposed ends of one or each axle are independently sprung so that each independently sprung wheel when it moves upwardly (due to unevenness of road surface) in relation to the vehicle chassis or body causes rotation of one end of one of a pair of longitudinally disposed torsion rods or tubes, and in which the other ends of the torsion rods or tubes, whilst being free to rotate in relation to the chassis or body, are provided with arms which extend upwardly or downwardly, preferably the latter, and are interconnected by a transverse coupling rod so as to prevent relative rotation of said other ends of the torsion rods or tubes.

The effect of a system of spring suspension as above described is that, when both independently sprung wheels tend to move upwardly in relation to the vehicle chassis or body such movement tends to turn the torsion rods or tubes oppositely at their ends nearer the wheels, but relative rotation of the other or remote ends of the torsion rods or tubes is prevented by the coupling rod. Thus the vehicle chassis or body is resiliently supported against upward and downward movement, but the suspension offers no effective support to the chassis or body against rolling movement because when one wheel moves upwardly in relation to the chassis or body the other wheel must move or tend to move downwardly since the remote ends of the two torsion rods or tubes are constrained to turn together in the same direction and to the same extent by the coupling rod between them.

According to this invention additional spring means associated with the said coupling rod are provided tending to resist rolling movement of the vehicle body.

The spring means may consist of two coil springs surrounding the said coupling rod, each coil spring bearing at its one end against an abutment of the coupling rod and at its other end against an abutment of the body or chassis.

Embodiments of the invention are described with reference to the accompanying drawings, in which.

Figure 1:
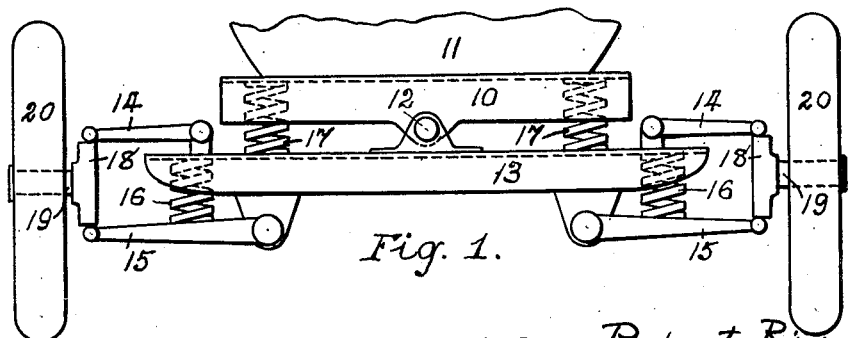
Figure 1 is a front elevation showing an application of the invention to front independent spring suspension of a motor vehicle.

Referring first to Figure 1, 10 indicates the chassis frame supporting the body 11 of a motor vehicle. The chassis frame 10 is connected by a longitudinal pivot 12 to a cross beam 13, to each end of which are pivoted upper and lower links 14 and 15 known as wish-bones which, at their outer ends, are pivoted to the upper and lower ends of the usual carrier 18 which carries the stub axle 19 on which the respective wheel 20 is mounted. Vertically disposed coil springs 16, 16, are placed between the ends of the beam 13 and the lower wishbones 15. Further vertically disposed coil springs 17, 17, are placed between the sides of the chassis frame and the beam 13.

It will be seen that upward movement of either wheel is transmitted to the respective end of the beam 13, and upward pressure of the beam is transmitted to the chassis 10 mainly through the pivot axis 12, so that the springs 17, 17, may be of different resiliency from that of the springs 16, 16, which have to support the weight of the vehicle.

Any tendency of the body to rock or roll, being resisted mainly by the springs 17, 17, has little or no effect on the up-and-down movement of the chassis 10 and hence of the body 11 which it carries.

Figure 2:
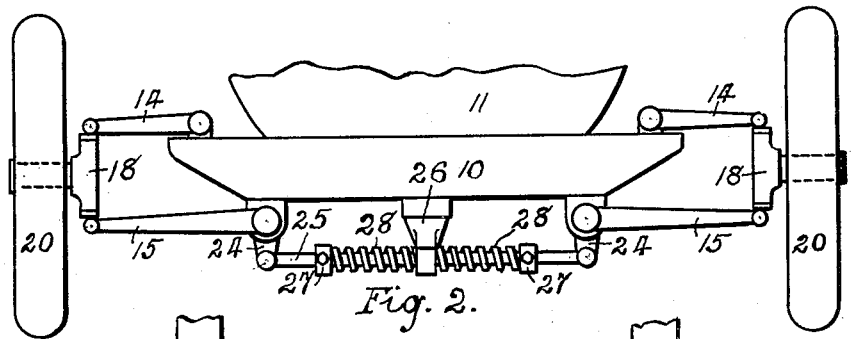
Figure 2 is a view corresponding to Figure 1, but showing an application of the invention in a case where the main supporting springs are torsion springs.
Figure 3:
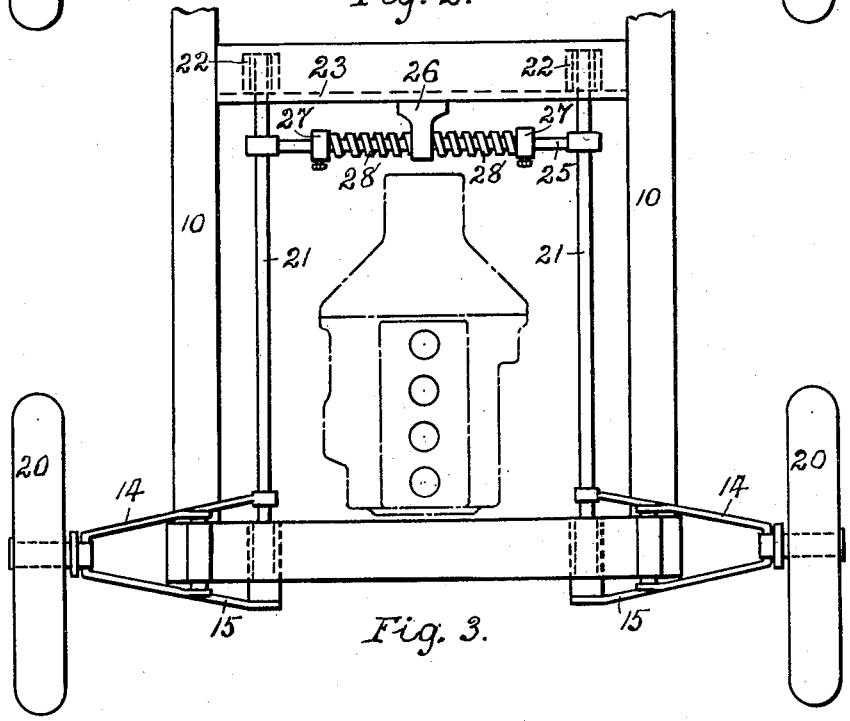
Figure 3 is a fragmentary plan view illustrating the spring suspension shown in Figure 2.

Referring to Figures 2 and 3, the chassis is at each side linked to the respective carrier 18 through upper and lower wishbones 14, 15. Rigidly secured, at their forward ends, to the lower wishbones 15, 15, are two rearwardly extending rods 21, 21, which, at their rearward ends, are journalled in brackets 22, 22, carried by a fixed transverse plate 23 of the chassis 10.

Rigidly secured on the rods 21, 21, and near their rearward ends, are downwardly extending arms 24, 24, which, at their lower ends, are pivoted to a transverse coupling rod 25.

It will be seen that, if both wheels move up, the movement is resisted by the torsion rods 21, 21, the front end of the near side rod turning anti-clockwise as seen from the front, and the front end of the off-side rod turning clockwise. The rear ends of the rods are held from turning by the coupling rod 25 acting through the arms 24, 24, which both pull on the ends of the rod 25. If one wheel only moves up, torque is transmitted from the respective rod 21 to the other rod 21 which is held from turning, at its forward end, by the respective wish-bone 15. Hence the vehicle is supported for up-and-down movement by the two torsion rods.

So far as the spring suspension of Figures 2 and 3 has now been described, however, there is no resistance to rocking or rolling movement of the vehicle body, because either wish-bone 15 can move up in relation to the chassis 10 moving the coupling rod endwise thus causing the other wish-bone 15 to move down.

In order to support the vehicle body against rocking or rolling the coupling rod 25 passes loosely through a bracket 26 secured to the plate 23. On the coupling rod 25 are two adjustably fixed collars 27, 27, and between these collars and the bracket 26 are placed two coil springs 28, 28, surrounding the rod.

If the vehicle body tends to roll towards the near side, the wish-bone 15 at the near side tends to move up in relation to the body and the wish-bone 15 at the off side tends to move down. Hence the coupling rod 25 tends to move towards the near side. This movement is, however, resisted by the coil spring 28 on the off side. Thus the body is resiliently supported against rolling or rocking by the springs 28, 28, which may have different resiliency from that of the torsion rods 21, 21.

Having fully described our invention, what we claim and desire to secure by Letters Patent is:

1. Spring suspension for a vehicle comprising torsion members disposed longitudinally of and mounted on said vehicle, arms disposed transversely of and connected to said torsion members, arms mounted in substantially parallel relation and fixed to said torsion members, a coupling member joining the free ends of said last mentioned arms, an abutment associated with said coupling member intermediate the same and fixed relative to said vehicle, and spring means disposed at each side of said abutment in a manner to resist longitudinal movement of said coupling member to thereby reduce rolling movement of the vehicle.

2. Spring suspension for a vehicle comprising supporting members pivotally mounted on said vehicle transversely thereof, torsion members fixed to said supporting members and adapted to be rotated by the pivoting action of said supporting members, lever arms connected to said torsion members and disposed in substantially parallel relation, a connection between said lever arms, spring means associated with said connection, and abutment means fixed relative to the vehicle and adapted to operate against said spring means to resist longitudinal movement of said connection.

3. Spring suspension for a vehicle comprising supporting members pivotally mounted on said vehicle thereof, torsion members fixed to said supporting members and adapted to be rotated thereby, lever arms mounted in substantially parallel relation and connected to said torsion members a substantial distance from where the torsion members are fixed to the supporting members, a connection between said lever arms and spring means acting between the fixed portion of the vehicle and said connection to resist longitudinal movement of said connection.

4. A spring suspension system for a vehicle comprising longitudinally extending torsion members mounted on said vehicle, laterally extending arms fixed to said torsion members, pivotally mounted arms extending from said vehicle and cooperating with said laterally extending arms to retain a wheel carriage in substantially vertical position, arms fixed on said torsion members and spaced from said laterally extending arms, transverse coupling members coupling the free ends of said last mentioned arms and resilient means associated with said vehicle to resist transverse movement of said coupling members.

JOHN ROBERT RIX.
ARTHUR WILLIAM ELLCOCK.

REFERENCES CITED

The following references are of record in the file of this patent:

UNITED STATES PATENTS

| Number | Name | Date |
|---|---|---|
| 962,256 | Rockwell | June 21, 1910 |
| 2,071,577 | Renwick et al. | Feb. 23, 1937 |
| 2,099,819 | Mercier | Nov. 23, 1937 |
| 2,344,072 | Winkelmann | Mar. 14, 1944 |
| 2,352,053 | Wilfert et al. | June 20, 1944 |

FOREIGN PATENTS

| Number | Country | Date |
|---|---|---|
| 63,176 | Denmark | Feb. 12, 1945 |
| 354,676 | Germany | June 12, 1922 |
| 434,330 | Great Britain | Aug. 29, 1935 |
| 452,113 | France | Feb. 28, 1913 |